US008682885B2

(12) United States Patent
Bolotnikoff et al.

(10) Patent No.: US 8,682,885 B2
(45) Date of Patent: Mar. 25, 2014

(54) METHOD AND SYSTEM FOR COMBINING DATA OBJECTS

(75) Inventors: David Lotan Bolotnikoff, Tzur Moshe (IL); Netanel Slomianski, Newtown Square, PA (US); Natan Teren, Malvern, PA (US); Dmitry Gorenchteine, Vancouver (CA); Tal Sapan, Raanana (IL); Udi Cohen, Alfei Menashe (IL); Kobi Sasson, Kfar-sava (IL); Shachar Soel, Kfar-sava (IL)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/471,622

(22) Filed: May 15, 2012

(65) Prior Publication Data

US 2013/0311443 A1 Nov. 21, 2013

(51) Int. Cl.
*G06F 17/30* (2006.01)
(52) U.S. Cl.
CPC .................. *G06F 17/30466* (2013.01)
USPC ......................................................... 707/714
(58) Field of Classification Search
CPC .................. G06F 17/30392; G06F 17/30498; G06F 17/3005
USPC ........................................... 707/705, 713, 714
See application file for complete search history.

(56) References Cited

U.S. PATENT DOCUMENTS

| 2005/0055369 | A1* | 3/2005 | Gorelik et al. ................. 707/102 |
| 2008/0162622 | A1* | 7/2008 | Becker et al. ................. 709/201 |
| 2011/0225484 | A1 | 9/2011 | Lotan-Bolotnikoff et al. |
| 2013/0117255 | A1* | 5/2013 | Liu et al. ....................... 707/714 |

\* cited by examiner

*Primary Examiner* — Neveen Abel Jalil
*Assistant Examiner* — Matthew Ellis
(74) *Attorney, Agent, or Firm* — Fish & Richardson P.C.

(57) ABSTRACT

Systems and methods for combining data objects are provided. A computer system may analyze each of the data objects, identify at least one possible combination operation between the data objects, and present the identified combination operation to a user interface. The identified combination operation may include a union or a join operation. The computer system may further determine a combination grade associated with the identified combination operation and present the combination grade to the user interface. Subsequently, the computer system may receive a selection of a particular presented combination operation via the user interface and execute the particular combination operation between the data objects.

20 Claims, 6 Drawing Sheets

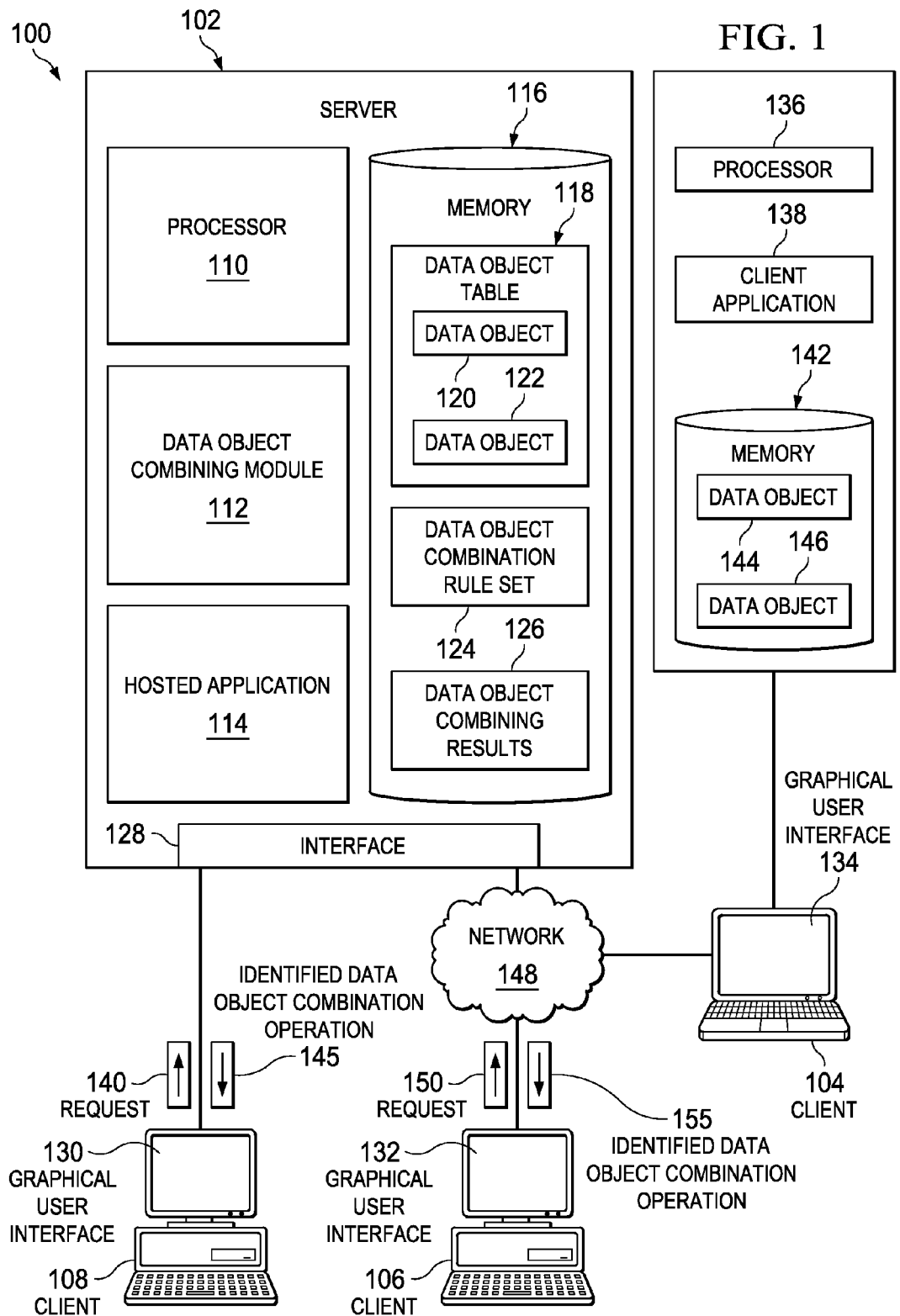

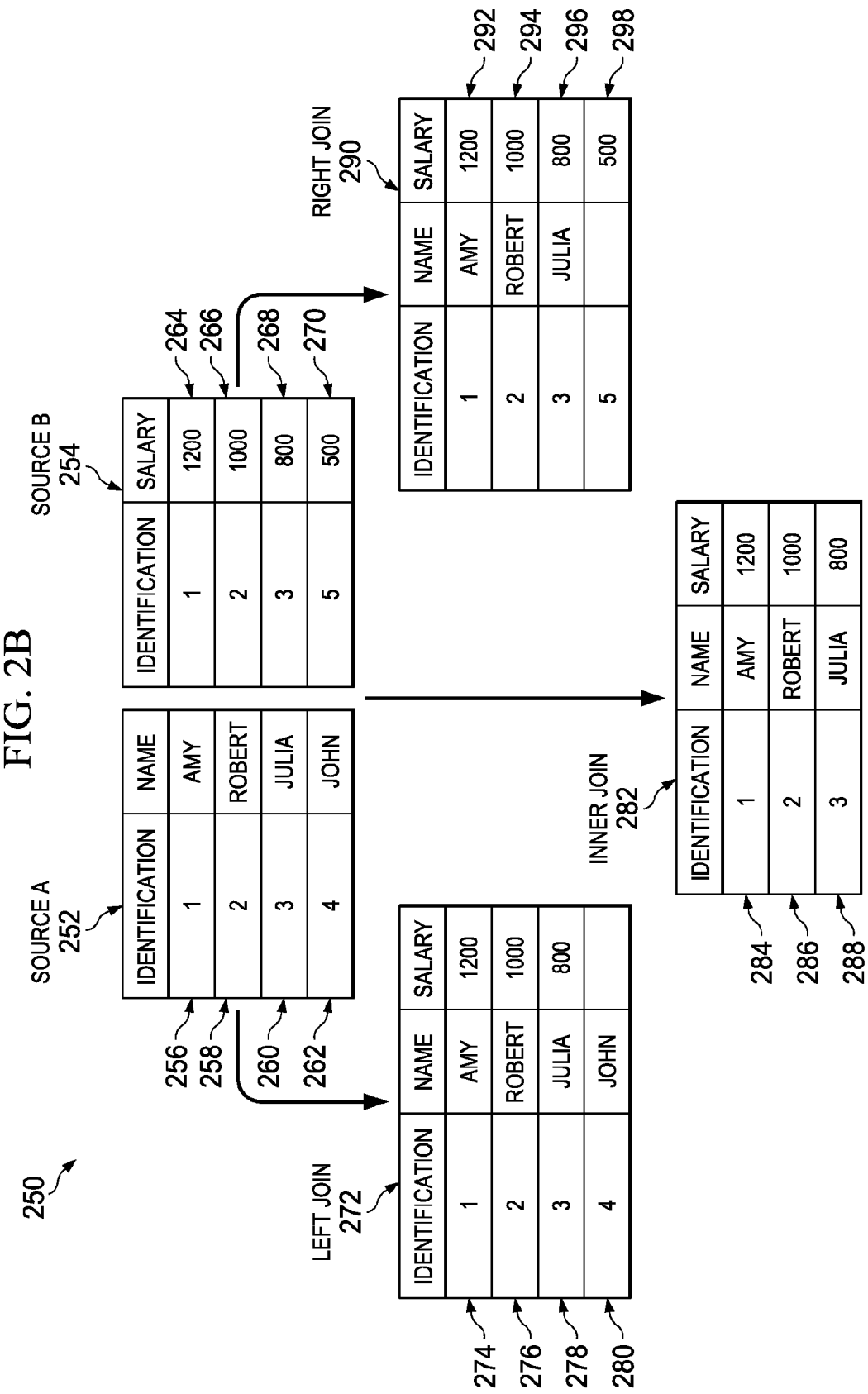

METHOD AND SYSTEM FOR COMBINING DATA OBJECTS

TECHNICAL FIELD

This disclosure relates to methods and systems for combining data objects, and more particularly, to identifying data object combination operations and presenting at least a portion of the identified combination operations to a user interface.

BACKGROUND

Databases are commonly used in business and organizations to manage information of employees, clients, products, etc. These databases are often custom databases generated by the business or organization or purchases from a database vendor or designer. Frequently, a user needs to combine data objects from different sources into a common database for information management. Combining two data objects into one common data object typically requires in-depth knowledge on the data structure of each data object. The task of combining data objects involves complex technical skills and often is error-prone for business users.

SUMMARY

The details of one or more embodiments of the disclosure are set forth in the accompanying drawings and the description below. Other features, objects, and advantages of the disclosure will be apparent from the description and drawings, and from the claims. Systems and methods for combining data objects are provided. A computer system may analyze each of the data objects, identify at least one possible combination operation between the data objects, and present the identified combination operation to a user interface. The identified combination operation may include a union or a join operation. The computer system may further determine a combination grade associated with the identified combination operation and present the combination grade to the user interface. Subsequently, the computer system may receive a selection of a particular presented combination operation via the user interface and execute the particular combination operation between the data objects.

DESCRIPTION OF DRAWINGS

FIG. 1 is a schematic block diagram of an example system for identifying and presenting data object combination operations.

FIG. 2B is an example graph illustrating join operations between data objects.

Like reference symbols in the various drawings indicate like elements.

DETAILED DESCRIPTION

Figure 2A:
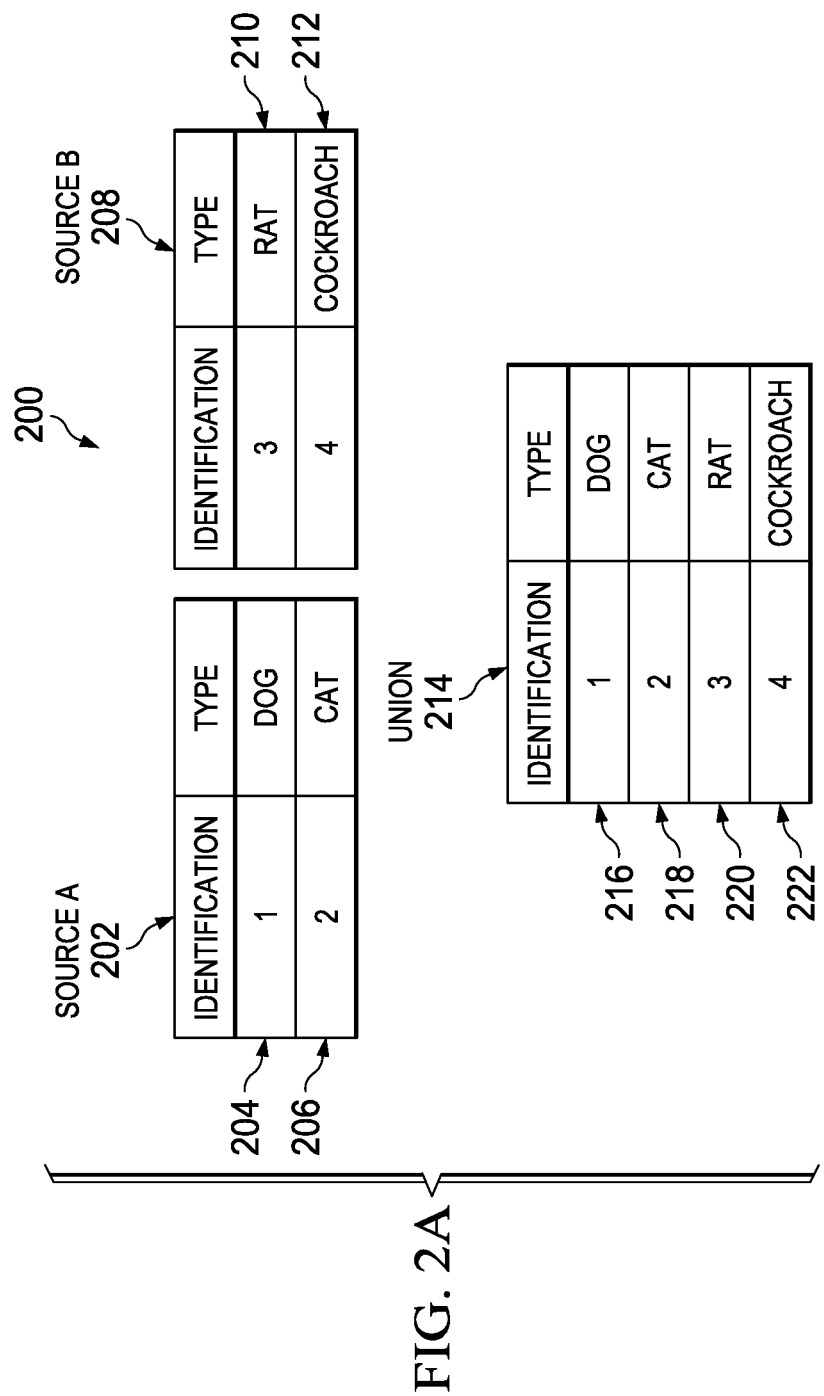
FIG. 2A is an example graph illustrating a union operation between data objects.

The present disclosure pertains to systems, methods, and computer program products for identifying data object combination operations and presenting at least a portion of the identified combination operation to a user interface. The identified combination operation may include a union or a join operation. A combination grade representing a degree of certainty associated with the identified combination operation may also be determined and presented to the user interface. By presenting the identified combination operation and associated combination grade to the user interface, the user of the network may select the appropriate data object combination operation with a high level of accuracy. In addition, knowledge of the database structure and advanced technical skills are not required for the user to perform the data object combination operation. The type of data objects to be combined may be Excel® files, database tables, text-based tables, comma-separated value (CSV) files, flat files, or any other information that can be viewed or modified to be viewed as tables.

FIG. 1 is a schematic block diagram 100 of an example system for identifying and presenting data object combination operations. System 100 may include a server 102 and a client 104. The server 102 and client 104 communicate across a network 148.

Server 102 includes a processor 110. Processor 110 executes data object combination requests from users of the network. A user of the network can be either an individual or a software application. Processor 110 can be, for example, a central processing unit (CPU), a blade, an application specific integrated circuit (ASIC), or a field-programmable gate array (FPGA), or other type of processors. Although FIG. 1 illustrates a single processor 110 in server 102, multiple processors may be used according to particular needs, and reference to processor 110 is meant to include multiple processors where applicable. In the illustrated implementation, processor 110 executes a data object combining module 112 and a hosted application 114.

Data object combining module 112 processes a request to combine data objects. The data object combining module 112 may make use of one or more data object tables 118 and a combination rule set 124 stored in a memory 116. In some instances, the combination rule set 124 may be a part of or included within the data object combining module 112. The data object combining module 112 may analyze at least a portion of the data objects to determine possible combination operations between the data objects. The data object combining module 112 may receive a request from a user of the network (e.g., a client or a software application) to identify possible data object combination operations between two data objects. The data object combining module 112 may first analyze a union operation between the data objects. If the union operation does not apply, the data object combining module 112 may further analyze a join operation between the data objects. The data object combining module 112 may further determine a combination grade in association with the join operation. In addition, the data object combining module 112 may execute a selected combination operation and store the results in the memory 116.

Server 102 may include a memory 116 for storing a data object table 118, a data object combination rule set 124, and data object combining results 126. The data object table 118 may include at least two data objects 120 and 122 that are requested to be combined. The data objects 120 and 122 may be Excel® files, database tables, text-based tables, comma-separated value (CSV) files, flat files, or any other information that can be viewed or modified to be viewed as tables. The data objects 120 and 122 may also be business objects, as well as other types of data objects. The data object combination rule set 124 contains a set of pre-defined data object combination rules, e.g., rules, descriptions, and settings for when a union operation, a left join operation, a right join operation, an inner join operation, or other combination operations are to be recommended and/or applied, as well as how such combination operations are to be performed. The data object combining results 126 may contain executed combination results for the data objects 120, 122, in association with one of the combination operations stored in the data object combination rule set 124. In some instances, the data object combining results 126 may store temporary, or incomplete, combination results while an analysis is being performed, as well as completed result sets once the analysis is complete. In some instances, at least a portion of the completed results may be persisted in case the same data objects are requested to be combined at a later time.

Memory 116 may include any memory or database module and may take the form of volatile or non-volatile memory including, without limitation, magnetic media, optical media, random access memory (RAM), read-only memory (ROM), removable media, or any other suitable local or remote and/or distributed memory and retrieved across a network, such as in a cloud-based computing environment.

Processor 110 may also execute a hosted application 114 on the server 102. In some implementations, the hosted application 114 may be a business application for an enterprise or other small business such as client 104. For instance, the hosted application 114 may provide an end-to-end solution for a business entity, thereby allowing the business entity to more effectively and efficiently operate its business operations, processes, and enterprise. As part of the hosted application 114, the data object table 118 may be provided or accessible to the business entity, such as the client 104.

Server 102 may be any computer or processing device such as a mainframe, a blade server, general-purpose personal computer (PC), Macintosh®, workstation, UNIX-based computer, or any other suitable device. Generally, FIG. 1 provides merely one example of computers that may be used with the disclosure. In other words, the present disclosure contemplates computers other than general purpose computers, as well as computers without conventional operating systems. The term "computer" is intended to encompass a personal computer, workstation, network computer, mobile computing device, or any other suitable processing device. For example, although FIG. 1 illustrates one server 102 that may be used with the disclosure, system 100 can be implemented using computers other than servers, as well as a server pool. Server 102 may be adapted to execute any operating system including z/OS, Linux-Intel® or Linux/390, UNIX, Windows Server®, or any other suitable operating system. According to one implementation, server 102 may also include or be communicably coupled with a web server and/or an SMTP server.

Server 102 may also include interface 128 for communicating with other computer systems, such as client 104, over network 148 in a client-server environment or any other type of distributed environments. In certain implementations, server 102 receives requests for data access from local or remote senders through interface 128 for storage in memory 116 and/or processing by processor 110. Generally, interface 128 comprises logic encoded in software and/or hardware in a suitable combination and operable to communicate with network 148. More specifically, interface 128 may comprise software supporting one or more communication protocols associated with communications network 148 or hardware operable to communicate physical signals.

Network 148 facilitates wireless or wireline communication between computer server 102 and any other local or remote computer, such as client 104. Network 148 may be all or a portion of an enterprise or secured network. In another example, network 148 may be a VPN merely between server 102 and client 104 across a wireline or wireless link. Such an example wireless link may be via 802.11a, 802.11b, 802.11g, 802.11n, 802.20, WiMax, and many others. The wireless link may also be via cellular technologies such as 3GPP GSM, UMTS, LTE, etc. While illustrated as a single or continuous network, network 148 may be logically divided into various sub-nets or virtual networks without departing from the scope of this disclosure, so long as at least portion of network 148 may facilitate communications between senders and recipients of requests and results. In other words, network 148 encompasses any internal and/or external network, networks, sub-network, or combination thereof operable to facilitate communications between various computing components in system 100. Network 148 may communicate, for example, Internet Protocol (IP) packets, Frame Relay frames, Asynchronous Transfer Mode (ATM) cells, voice, video, data, and other suitable information between network addresses. Network 148 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 148 may be a secure network associated with the enterprise and remote clients 104, 106 and 108.

System 100 allows for a client, such as client 104, to access data objects stored in the server 102 and retrieve data object combination results from the server 102. The client 104 may include a processor 136, a client application 138, and a memory 142. Data objects 144 and 146 may be stored in the memory 142. In some instances, one or more of the data objects 144, 146 at the client 104 may be used instead of, or in combination with, one or more of the data objects 120, 122 at the server 102 for combination purposes. The client application 138 may be a business software application that makes use of the data objects 144 and 146. The processor 136 may execute the client application 138. Client 104 may send a request 140, including data objects 144 and 146 stored in memory 142, to the server 102 via the network 148. Upon receiving the request 140, the server 102 may identify at least one data object combination operation and deliver the identified data object combination operation 145 to the client 104. The system 100 may include other clients, such as 106, in addition to client 104. The client 106 may include a graphical user interface (GUI) 132 through which one or more interfaces with the data object combination module 112 may be presented to the client 106. Similar to the client 104, the client 106 may send a request 150 to the server 102 via the network 148 for data object combining and receive at least one identified data object combination operation 155 from the server 102.

In some implementations of system 100, a local user 108 may utilize or execute the data object combination module 112 hosted on the server 102. As illustrated in FIG. 1, the local user 108 may be communicably coupled to the server 102. In other words, the local user 108 may be at the same location as the server 102, or alternatively, reside at a separate location but be in communication with the server 102. The local user 108 may include a GUI 130 through which one or more interfaces with the data object combination module 112 may be presented to the local user 108.

It will be understood that there may be any number of clients 104 communicably coupled to server 102. This disclosure contemplates that many clients may use a computer or that one user may use multiple computers to submit or review queries via a graphical user interface (GUI) 134. As used in this disclosure, clients may operate remote devices, such as personal computers, touch screen terminals, workstations, network computers, kiosks, wireless data ports, wireless or wireline phones, personal data assistants (PDAs), one or more processors within these or other devices, or any other suitable processing device, to execute operations associated with business applications. For example, client 104 may be a PDA operable to wirelessly connect with an external or unsecured network. In another example, client 104 may comprise a laptop that includes an input device, such as a keypad, touch screen, mouse, or other device that can accept information, and an output device that conveys information associated with the operation of server 102 or client 104, including digital data, visual information, or GUI 134. Both the input device and output device may include fixed or removable storage media such as a magnetic computer disk, CD-ROM, or other suitable media to both receive input from and provide output to users of client 104 through the display, namely, over GUI 134.

GUI 134 includes a graphical user interface operable to allow the user of client 104 to interface with at least a portion of system 100 for any suitable purpose, including viewing, manipulating, editing, etc., graphic visualizations of user profile data. Generally, GUI 134 provides the user of client 104 with an efficient and user-friendly presentation of data provided by or communicated within system 100. GUI 134 may comprise a plurality of customizable frames or views having interactive fields, pull-down lists, and buttons operated by the user. In one implementation, GUI 134 presents information associated with queries and buttons and receives commands from the user of client 104 via one of the input devices. Moreover, it should be understood that the terms graphical user interface and GUI may be used in the singular or in the plural to describe one or more graphical user interfaces and each of the displays of a particular graphical user interface. Therefore, GUI 134 contemplates any graphical user interface, such as a generic web browser or touch screen, which processes information in system 100 and efficiently presents the results to the user. Server 102 can accept data from client 104 via the web browser (e.g., Microsoft® Internet Explorer or Mozilla® Firefox®) and return the appropriate HTML or XML responses using network 148. For example, server 102 may receive a request from client 104 using a web browser or application-specific graphical user interface, and then may execute the request to identify data object combination operations and present at least a portion of the identified combination operations to the user interface.

FIG. 2A is an example graph 200 illustrating a union operation between data objects. As shown in FIG. 2A, a union combination operation is executed between a data object 202 from source A and a data object 208 from source B, which results in a combination data object 214. In some instances, source A and source B may be the same system, server, or memory, such that the data objects 202 and 208 may be local to one another, while in other instances, source A and source B may be logically or physically remote from one another. The illustrated data object 202 includes a first row 204 and a second row 206. The data object 208 includes a first row 210 and a second row 212. Each row of 204, 206, 210, and 212 includes a unique ID number and a data field representing type of the ID. After the union combination operation, each row of the data objects 202 and 208 is contained in the combination data object 214. The combination data object 214 includes a total number of 4 rows, i.e., 216-222. Rows 216 and 218 of combination data object 214 are identical to rows 204 and 206 from data object 202 and Rows 220 and 222 of combination data object 214 are identical to rows 210 and 212 from data object 208. In other words, the data set is enlarged in the combination object 214 after the union operation compared to the data object 202 and 208.

FIG. 2B is an example graph 250 illustrating join operations between data objects. Three types of join operations are illustrated, i.e., a left join, an inner join, and a right join. As shown in FIG. 2B, a data object 252 from source A and a data object 254 from source B are combined using different types of join operations. As in FIG. 2A, the sources may be the same or different. Data object 252 includes a total number of 4 rows, i.e., rows 256-262, and each row consists of a unique ID number and a data field representing name of the ID. Data object 254 also includes a total number of 4 rows, i.e., rows 264-270, and each row consists of a unique ID number and a data field representing salary of the ID.

Data object 272 is a combination object after a left join operation between data objects 252 and 254. If data objects 252 and 254 have a matching ID number, the data field of data objects 252 and 254 for that ID number would be contained in the combination data object 272. For example, row 256 of data object 252 has a matching ID number with row 264 of data object 254. As a result, row 274 of the combination data object 272 contains data fields (i.e., name and salary) from both data objects 252 and 254 corresponding to the matching ID number. Likewise, rows 258 and 260 of data object 252 have matching ID numbers with rows 266 and 268 of data object 254. As a result, rows 276 and 278 of the combination data object 272 contain data fields (i.e., name and salary) from both data objects 252 and 254 corresponding to the matching ID numbers. When a row of the left table, i.e., a row of data object 252 does not have a matching ID with any row of data object 254, the result of a left join for data objects 252 and 254 always contains all records of the left table. For example, as shown in FIG. 2B, row 262 of data object 252 has an ID number that cannot be matched to any row of data object 254. Thus, the combination data object 272 contains the ID number and data field of row 262 of data object 252 alone, which are included in row 280. On the other hand, for the left join operation, if any of the rows in the right table, i.e., data object 254, does not have a matching ID in the left table, i.e., data object 252, that row of the right table would not be included in the combination data object. For example, row 270 of data object 254 contains an ID number that cannot be matched to any row of data object 252 and, thus, information contained in row 270 is not included in the combination data object 272.

Data object 282 is a combination data object after an inner join operation between data objects 252 and 254. Different from the left join operation, the inner join operation contains only data fields that have matching IDs between data objects 252 and 254. The number of rows in data object 282 is less than the number of rows in data object 272 in this example. If a row in the left table (i.e., data object 252) does not have a matching ID in the right table (i.e., data object 254), that row would not be included in the combination data object. As shown in FIG. 2B, data objects 252 and 254 have matching ID numbers as 1, 2 and 3. Therefore, combination data object 282 contains rows 284-288 for ID numbers 1, 2 and 3. Each row of 284-288 includes the ID number and data fields of objects 252 and 254 (e.g., name and salary).

Data object 290 is a combination data object after a right join operation between data objects 252 and 254. The result of a right join for data objects always contains all records of the right table, i.e., data object 254. As shown in FIG. 2B, all rows of data object 254 are contained in rows 292-298 of data object 290. In addition, data fields of data object 252 are added in rows 292-296 because matching IDs are found in data object 252. For example, the names of IDs 1, 2, and 3 are imported from data object 252 to the combination data object 290. For ID number 5, no matching ID is found in data object 252 and, thus, the corresponding name field in row 298 is left blank.

Figure 3:
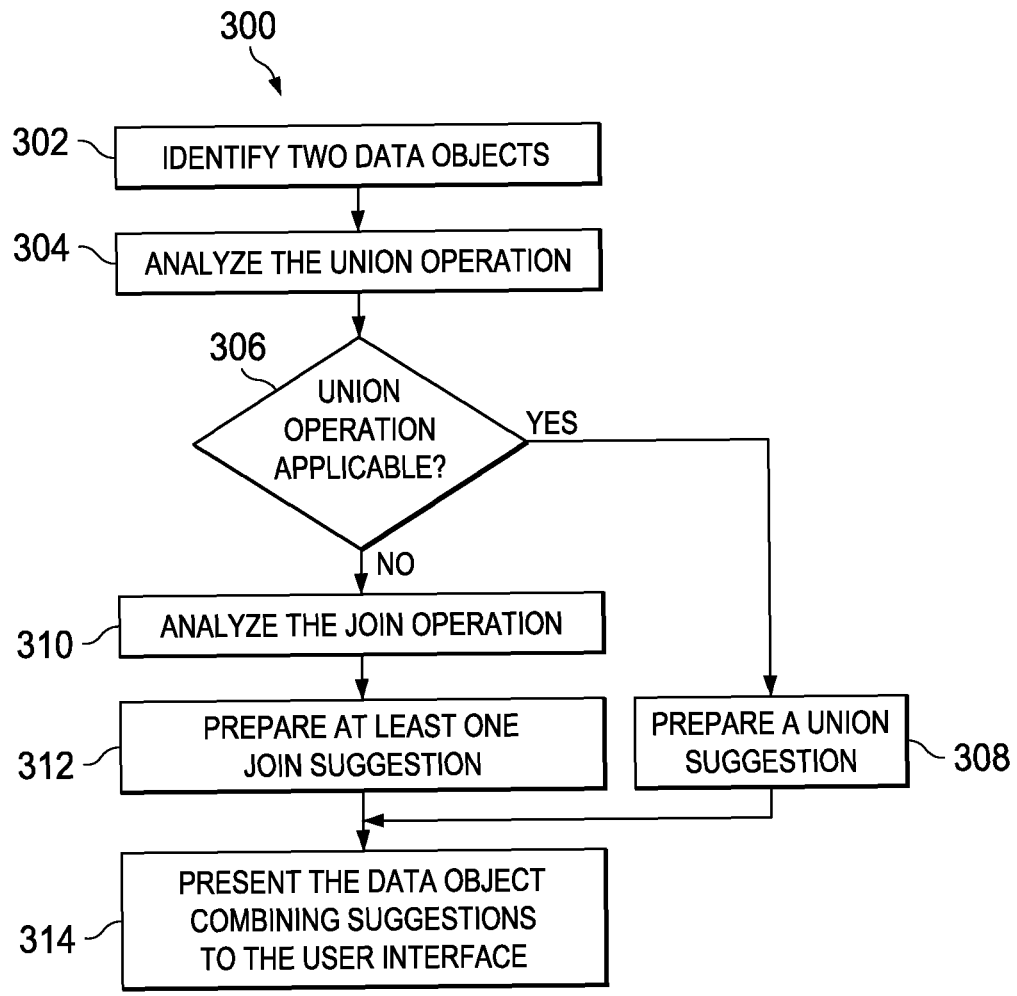
FIG. 3 is a process flow chart illustrating an example method for identifying data object combination operations.

FIG. 3 is a process flow chart 300 illustrating an example method for identifying data object combination operations. The illustrated method may be executed in some implementations by the data object combining module 112 at a server 102, a remote client 104, or a local client 108 (as shown in FIG. 1). As shown in FIG. 3, two data objects are identified at 302. The data objects may be Excel® files, or any other datasets that can be viewed as tables. As illustrated in the example flow chart 300, a first operation of identifying data object combination operations may be analyzing the union operation between the two data objects at 304. Analyzing the union operation may include analyzing names and data types of each column of the data objects. A detailed example process flow chart for analyzing the union operation is described in reference to FIG. 4. The data object combining process may determine whether the union operation is applicable to combine the two data objects at 306. A union operation may be applicable to combine the two data objects when each column of one data object can be mapped to a column in the other data object. If the union operation is applicable, the data object combining process may prepare a union suggestion at 308 and present the union suggestion to the user interface at 314.

If it is determined that the union operation is not applicable, the data object combining process 300 can move to 310, where possible join operations are analyzed. Uniqueness of all the columns in both data objects may be analyzed for the join operation. An intersect score may be calculated for each pair of columns of the two data objects. The column uniqueness and the intersect score may be jointly considered to calculate prediction score for each pair of columns. The data object combining process may determine possible join operations based on the prediction score. A detailed example process flow chart for analyzing the join operation is described in reference to FIG. 5. After the possible join operations are identified, the data object combining process may prepare at least one join suggestion at 312 and present the data object combining suggestion to the user interface at 314. In some implementations, the data object combining process may receive a selection of a particular presented combination operation via the user interface. The data object combining process may further execute the particular combination operation of the data objects and store the results of the executed combination operation as a different data object.

Figure 4:
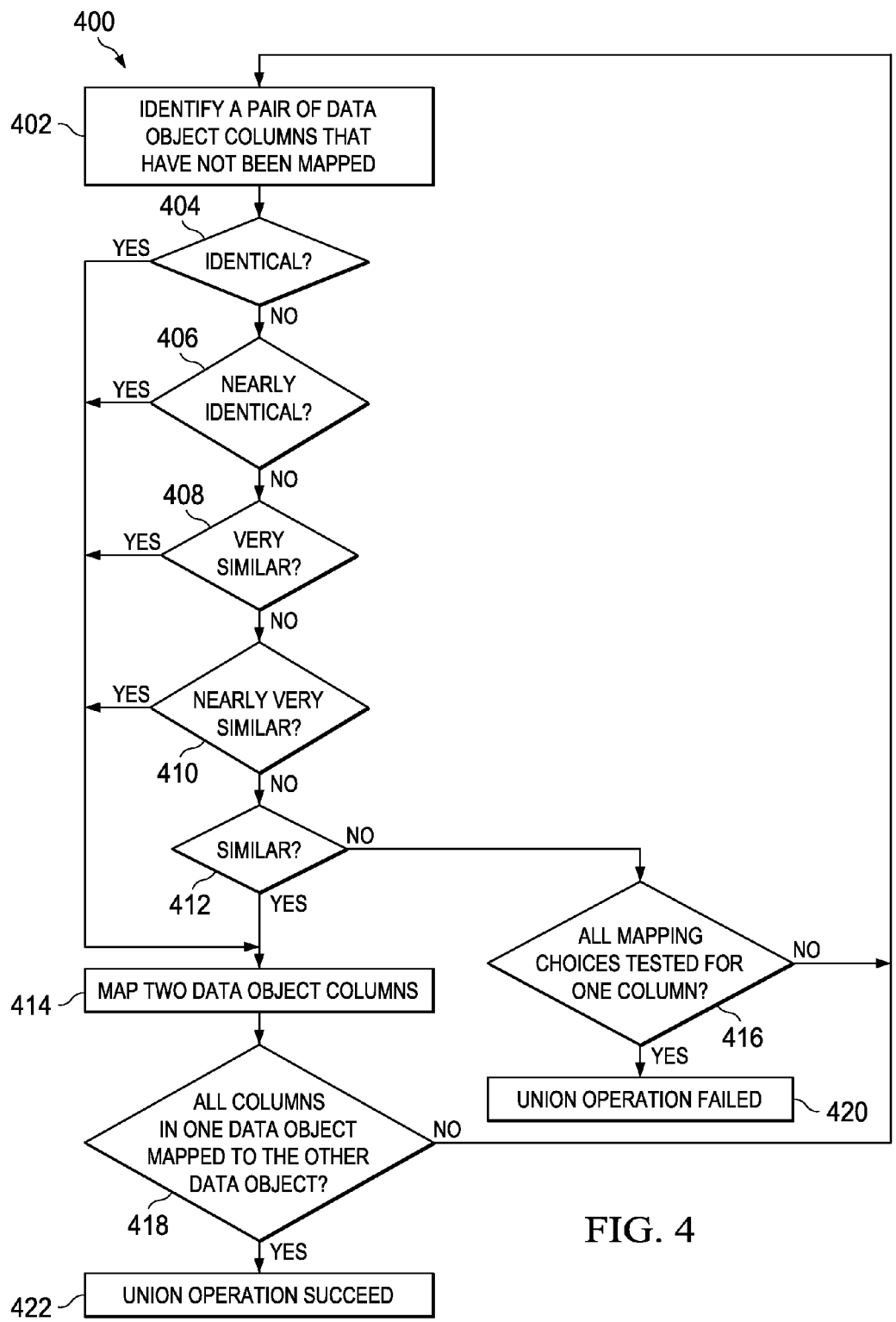
FIG. 4 is a process flow chart illustrating an example method for analyzing a union operation for combining data objects.

FIG. 4 is a process flow chart 400 illustrating an example method for analyzing a union operation for combining data objects. The method for analyzing the union operation for combining data objects may be executed by the data object combining module 112 at the server or client. As shown in the example process of FIG. 4, the data object combining process first identifies a pair of data object columns that have not been mapped at 402. Before comparing the columns from the two data objects, a direction can be defined from the object with the lowest number of columns ("lowobj") to the object with the largest number of columns ("highobj"). If the current pair is not similar, then the next column from "highobj" can be selected. Each of the columns in the "lowobj" are checked against the remaining columns of the "highobj" (i.e., columns that have been mapped are not being inspected again) until no addition columns remain.

At the initial stage of analyzing the union operation, the pair of data object columns may be selected from a set of columns that include all columns of the two data objects—one from each data object. The data object combining process may determine whether the identified pair of data object columns is identical at 404. Two columns may be considered identical when their names and data types are exactly the same. Referring to FIG. 2A, the first column of data object 202 may be deemed as identical to the first column of data object 208 because the names of the columns are both "ID" and both columns have integer data types. If the pair of data object columns is identical at 404, the data object combining process may map these two data object columns at 414. The data object combining process may further proceed to 418 to determine whether all columns in one data object are mapped to the other data object. If the answer is yes, the union operation is successful as shown in 422 and the process of analyzing the union operation is completed. Otherwise, these mapped columns are removed from the second data object's list of potential columns for future column mapping. The data object combining process may return to 402 to identify a pair of remaining data object columns that have not been mapped.

Returning to 404 of the process flow chart, if the identified two data object columns are not identical, the data object combining process may further check whether these two columns are nearly identical at 406. For example, two columns of the data objects may be considered nearly identical if their names are equal. For two columns to be considered nearly identical, their data types may not need to be the same as long as their names are the same. Thus, two columns of the data objects may be determined as not identical at 404 but determined as nearly identical at 406. If the two columns are determined to be nearly identical, the data object combining process may proceed to map these two data object columns at step 414. The data combining process may further proceed to 418 to determine whether all columns in one data object are mapped to the other data object. If the answer is yes, the union operation is successful as shown in 422 and the process of analyzing the union operation is completed. The data object combining process may return to 402 to identify a pair of remaining data object columns that have not been mapped.

Returning to 406 of the process flow chart, if the identified two data object columns are not nearly identical, the data object combining process may further check whether these two columns are very similar at 408. Two columns of the data objects may be considered as very similar if their canonical names and types are the same. The canonical presentation of the data object may be an inherent structure and usage constraints of data in a standardized form independent of the local interfaces. If the two columns from the data objects are determined to be very similar, the data object combining process may proceed to map the two data object columns at 414. The data combining process may further proceed to 418 to determine whether all columns in one data object are mapped to the other data object. If the answer is yes, the union operation is successful as shown in 422 and the process of analyzing the union operation is completed. Otherwise, these mapped columns are removed from the set of columns for future column mapping. The data object combining process may return to 402 to identify a pair of remaining data object columns that have not been mapped.

Returning to 408 of the process flow chart, if the identified two data object columns are not very similar, the data object combining process may further check whether these two columns are nearly very similar at 410. Two columns of the data objects may be determined as nearly very similar if their canonical names are the same but have different data types. If the two columns from the data objects are determined to be nearly very similar, the data object combining process may proceed to map the two data object columns at 414. The data combining process may further proceed to 418 to determine whether all columns in one data object are mapped to the other data object. If the answer is yes, the union operation is successful as shown in 422 and the process of analyzing the union operation is completed. Otherwise, these mapped columns are removed from the set of columns for future column mapping. The data object combining process may return to 402 to identify a pair of remaining data object columns that have not been mapped.

Returning to 410 of the process flow chart, if the identified two data object columns are not nearly very similar, the data object combining process may further check whether these two columns are similar at 412. Two columns of the data objects may be determined as similar if their canonical names are similar. The similarity between two columns may be expressed by a real value representing a similarity score. Identical data types may result in a slightly higher similarity score. If the data combining process determines that the two columns of the data objects are similar, it may proceed to map the two data object columns at 414. The data combining process may further proceed to 418 to determine whether all columns in one data object are mapped to the other data object. If the answer is yes, the union operation is successful as shown in 422 and the process of analyzing the union operation is completed. Otherwise, these mapped columns are removed from the set of columns for future column mapping. The data object combining process may return to 402 to identify a pair of remaining data object columns that have not been mapped.

If the two columns are identified to be not similar at 412, the data object combining process may proceed to check whether all mapping choices have been tested for one of the columns at 416. In other words, the data object combining process checks whether for each of the two columns there are other columns available to be mapped in the set of remaining columns. If all mapping choices have been tested for one of the identified two columns, i.e., there is no other column available in the set of remaining columns for one of the identified two columns, the union operation is considered failed for combining the two data objects at 420. If for each of the identified two columns, not all mapping choices have been tested, i.e., there are other columns available in the set of remaining columns, the data object combining process may return to 402 to identify a pair of remaining data object columns that have not been mapped. In other words, if all columns in "highobj" have been checked and no match is found to exist, there is not a union.

Figure 5:
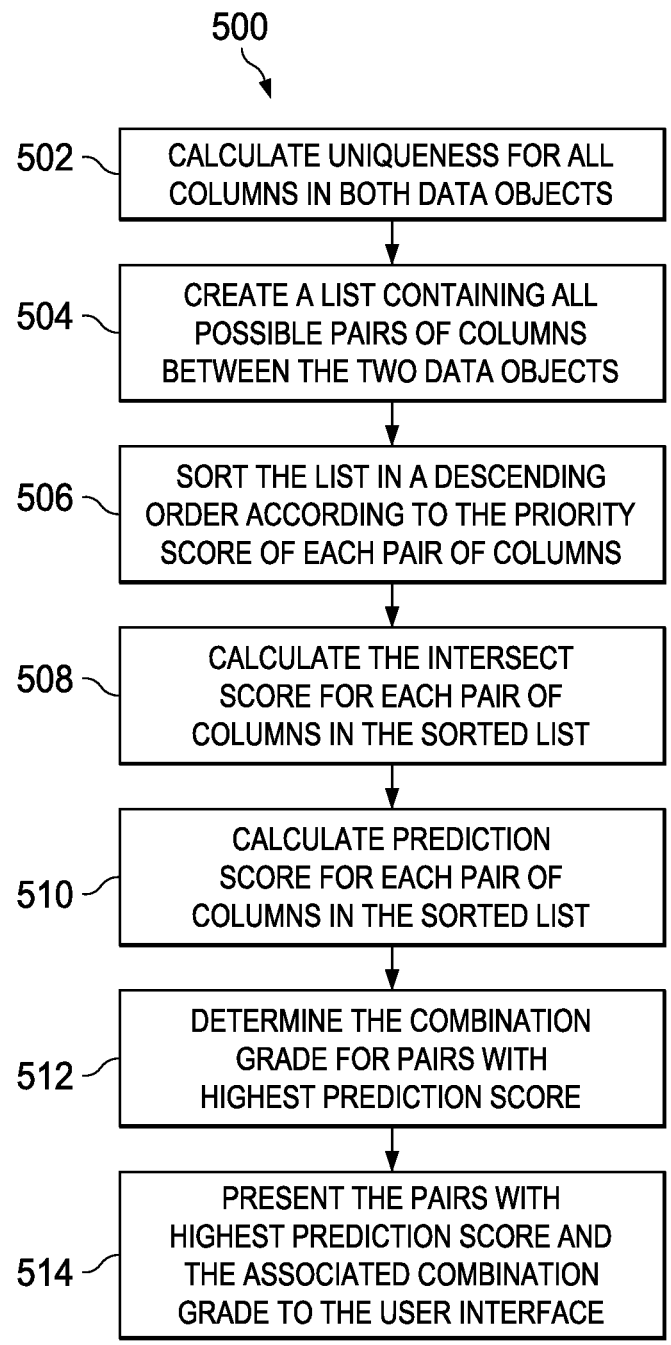
FIG. 5 is a process flow chart illustrating an example method for analyzing join operations for combining data objects.

FIG. 5 is a process flow chart 500 illustrating an example method for analyzing join operations for combining data objects. As shown in FIG. 5, the data object combining process may first calculate uniqueness for all columns in both data objects at 502. In some implementations, the uniqueness of a column may be calculated as the number of distinct elements of the column divided by the total number of elements of the column. For example, if a column includes elements $\{1, 1, 2, 2, 3\}$, the uniqueness of this column may be calculated as the number of distinct elements, i.e., 3, divided by the total number of the elements, i.e., 5, resulting in a uniqueness score of $3/5$. In some implementations, to reduce the number of round trips to the server while calculating the distinct elements of the columns, the calculation of distinct elements may be performed in batches, for example, with each batch twice as large as the previous batch (until some upper limit). For example, assume there are 127 columns to be checked from Source A, the distinct number of elements may be checked in the following batch sizes: 1, 2, 4, 8, 16, 32, 64 columns. Thus, instead of making 127 round trips to retrieve the data of each column, only 7 round trips to retrieve the data of columns need to be made for calculating the distinct elements of the columns, thereby reducing transaction overhead.

The data object combining module may create a list containing all possible pairs of columns between the two data objects at 504. The possible pairs of columns may include all the columns whose uniqueness scores have been calculated at 502. The possible pairs of columns may be a Cartesian product between the column sets of the two data objects. For example, if the first data object contains m columns and the second data object contains n columns, the total number of possible pairs of columns may be m×n.

After the list containing all possible pairs of columns is created, the data object combining process may sort the list in a descending order according to the priority score of each pair of columns at 506. To calculate the priority score associated with each pair of columns, multiple different factors may be considered. First, the similarity of the names of the columns may be considered. A higher priority score may be set for pairs of columns with better name similarity. Second, the similarity of the types of the columns may be considered. A higher priority score may be set for pairs of columns with better type similarity. Third, uniqueness of both columns may be considered. A higher priority score may be set for pairs of columns with higher uniqueness scores calculated at 502. In addition, certain column data types may automatically receive zero priority such as dates or timestamps. Further, certain combinations of column uniqueness may also automatically receive zero priority, for example, if uniqueness score of one column is extremely low, or if uniqueness scores of both columns are moderately low.

After sorting the list in a descending order according to the priority score of each pair of columns, the data object combining process may calculate the intersect score for each pair of columns in the sorted list at 508. The intersect score may be calculated by first determining the number of intersect elements between the pair of columns and dividing the number of intersect elements by the minimum number of distinct elements between the two columns. For example, if C1 has the elements $\{1,2,3,4,5,3,3,3\}$ and C2 has the elements $\{1,2,9\}$, the distinct element sets are $\{1,2,3,4,5\}$ and $\{1,2,9\}$. Accordingly, the number of intersect elements is 2 and the minimum number of distinct elements between the two columns is 3 in this example. Hence, the intersect score for this example would be $2/3$. To reduce round trips to the server, these intersect score calculations may be executed in batches which double in size for each iteration, similar to 502. The calculation of intersect scores may be time-consuming and, thus, a timeout may be used to retain interactivity for the user. As a result, some of the lower priority pairs may not have the intersect score calculated.

A prediction score may be calculated for each pair of the columns in the sorted list at 510 based on the uniqueness score calculated at 502 and intersect score calculated at 508. The prediction score may make use of both the intersect score and the pair uniqueness score. The intersect score and the pair uniqueness score may be non-linearly weighted such that for high pair uniqueness the weight of the intersect score may be smaller and for low pair uniqueness the weight of the intersect score may be greater. For example, a pair of columns with a 0.9 pair uniqueness score and a 0.3 intersect score may get a higher final prediction score than a pair of columns with a 0.6 intersect score and a 0.6 uniqueness score.

After the prediction score is calculated for each pair of columns in the sorted list, the data object combining process may determine the combination grade for pairs of columns with highest prediction score at 512. The combination grade may be high degree of certainty, medium degree of certainty, or failure. For example, when there is only one pair of columns having a prediction score higher than a predetermined high-score-threshold (e.g., 0.5), the combination grade may be set to high degree of certainty. Alternatively, or in addition, when there is one pair of columns having a prediction score higher than a predetermined very-high-score-threshold (e.g., 0.7) and the distance between the highest prediction score and the second highest prediction score is greater than or equal to a pre-identified amount (e.g., 0.2), the combination grade for the data object combination operations may also be set to high degree of certainty. In some implementations, when there is at least one pair of columns returned with a valid prediction score but the condition of high degree certainty is not satisfied, the combination grade for the data object combination operation may be set to medium degree of certainty. A combination degree of failure may be set when no valid results of prediction scores return or if all prediction score results are lower than a minimum-score-threshold (e.g., 0.3).

Subsequently, the data object combining process may present the at least one pair of columns with the highest prediction score and the associated combination grade to the user interface at 514. The data object combining process may also determine a join operation (e.g., left join, right join, inner join) and present the determined join operation to the user interface. The data object combining process may determine the join operation based on the magnitude of the data objects. For example, to generate an accurate view of the combined data object, an inner join operation may be used. To generate an analytical view of the combined data object with expanded data set, a left or right join may be used. In some implementations, the data object combining process may receive a selection of a particular presented combination operation via the user interface. The data object combining process may further execute the particular combination operation of the data objects and store the results of the executed combination operation as a different data object.

By analyzing the union or join operation, the data object combining process may identify appropriate data object combination operations and present them to the user interface. The identified data object combination operations may include one or more proposed combination operations, each with a relative combination grade or ranking to provide user context. This greatly reduces the complexity and improves the accuracy of combining data objects from a user's perspective. The user may select a data object combination operation based on the presented combination grade associated with each identified data object combination operations. Further, since the data object combining process may analyze the union operation first and may only analyze the join operation when the union operation is not applicable, the computation speed for the data object combination analysis may be increased without sacrifice of performance. In doing so, an efficient use of computing resources may also be realized. In response to the user selection, the data objects may be combined to form a new object representing the selected combination. The new object may be stored at the server and be accessible to the user.

A number of implementations of the disclosure have been described. Nevertheless, it will be understood that various modifications may be made without departing from the spirit and scope of the disclosure. Accordingly, other implementations are within the scope of the following claims.

What is claimed is:

1. A computer implemented method for combining data objects, comprising identifying a first and a second data object for a combination analysis, where the first and second data objects are column-based data objects, analyzing at least a portion of each of the first and second data objects to determine at least one possible combination between the data objects, identifying at least one join combination operation associated with the first and second data objects, wherein identifying the at least one join combination operation includes:

calculating a uniqueness score for each column in the first data object and for each column in the second data object;

identifying a list of column pairs from the columns of the first data object and the columns of the second data object;

calculating a priority score for at least a portion of the column pairs, wherein each priority score is based at least in part on a comparison of elements included in a particular column pair's column of the first data object and the corresponding column of the second data object;

calculating an intersect score for at least a portion of the column pairs, wherein each intersect score is based at least in part on a number of intersecting elements between the column of the first data object and the column of the second data object in a particular column pair and a number of distinct elements between the columns of the column pair;

calculating a prediction score based at least in part on each pair of columns' uniqueness score and intersect score, and presenting at least a portion of the at least one identified join combination operation to a user interface, wherein the presented portion of the at least one identified join combination operations corresponds to column pairs having relatively higher prediction scores.

2. The method of claim 1, further comprising:

receiving a selection of a particular presented join combination operation via the user interface in response to the presentation;

executing the particular join combination operation of the first and second data objects; and storing the results of the executed join combination operation as a third data object.

3. The method of claim 1, further comprising identifying at least one union operation associated with the first and second data objects.

4. The method of claim 3, wherein identifying at least one union operation associated with the first and second data objects includes at least one of:

determining that a first column from the first data object and a second column from the second data object are identical;

determining that the first column from the first data object and the second column from the second data object are nearly identical;

determining that the first column from the first data object and the second column from the second data object are very similar;

determining that the first column from the first data object and the second column from the second data object are nearly very similar; and determining that the first column from the first data object and the second column from the second data object are similar.

5. The method of claim 1, further comprising:
determining a combination grade for at least a subset of the column pairs; and
presenting an ordered list of the subset of the column pairs to the user interface based on the combination grade.

6. The method of claim 1, wherein the join combination operation is one of a left join operation, a right join operation, and an inner join operation.

7. The method of claim 1, further comprising:
determining a combination grade associated with the identified loin combination operations; and
presenting the combination grade to the user interface in association with the corresponding at least one identified join combination operation.

8. The method of claim 7, wherein the combination grade is one of high degree of certainty, medium degree of certainty, and failure.

9. The method of claim 1, wherein analyzing the at least a portion of each of the first and second data object includes:
analyzing a union operation between the first and second data objects; and
determining that the union operation is applicable to combine the first and second data object.

10. The method of claim 1, wherein analyzing the at least a portion of each of the first and second data objects includes:
analyzing a union operation between the first and second data objects;
determining that the union operation is not applicable to combine the first and second data objects;
analyzing a join operation between the first and second data objects; and
determining a combination grade associated with the join operation.

11. The method of claim 10, further comprising, in response to calculating prediction scores for column pairs,
selecting at least one pair of columns from the first and second data objects with a highest prediction score to determine the combination grade.

12. A computer program product, tangibly embodied m a non-transitory machine-readable storage device, the computer program product being operable to cause data processing apparatus to perform operations comprising identifying a first and a second data object for a combination analysis, where the first and second data objects are column-based data objects,
analyzing at least a portion of each of the first and second data objects to determine at least one possible combination between the data objects,
identifying at least one join combination operation associated with the first and second data objects calculating a uniqueness score for each column in the first data object and
for each column in the second data object;
identifying a list of column pairs from the columns of the first data object and the columns of the second data object;
calculating a priority score for at least a portion of the column pairs, wherein each priority score is based at least in part on a comparison of elements included in a particular column pair's column of the first data object and the corresponding column of the second data object;
calculating an intersect score for at least a portion of the column pairs,
wherein each intersect score is based at least in part on a number of intersecting elements between the column of the first data object and the column of the second data object in a particular column pair and a number of distinct elements between the columns of the column pair;
calculating a prediction score based at least in part on each pair of columns' uniqueness score and intersect score, and
presenting at least a portion of the at least one identified join combination operation to a user interface,
wherein the presented portion of the at least one identified join combination operations corresponds to column pairs having relatively higher prediction scores.

13. The computer program product of claim 12, further comprising:
receiving a selection of a particular presented join combination operation via the user interface in response to the presentation;
executing the particular join combination operation of the first and second data objects; and
storing the results of the executed join combination operation as a third data object.

14. The computer program product of claim 12, further comprising:
determining a combination grade associated with the at least one identified join combination operation; and
presenting the combination grade to the user interface in association with the corresponding at least one identified join combination operation.

15. A system for combining data objects, the system comprising one or more processors operable to identify a first and a second data object for a combination analysis, where the first and
second data objects are column-based data objects,
analyze at least a portion of each of the first and second data objects to determine at least one possible combination between the data objects,
identify at least one loin combination operation associated with the first and second data objects, wherein identifying the at least one join combination operation includes:
calculating a uniqueness score for each column in the first data object and
for each column in the second data object;
identifying a list of column pairs from the columns of the first data object and the columns of the second data object;
calculating a priority score for at least a portion of the column pairs, wherein each priority score is based at least in part on a comparison of elements included in a particular column pair's column of the first data object and the corresponding column of the second data object;
calculating an intersect score for at least a portion of the column pairs,
wherein each intersect score is based at least in part on a number of intersecting elements between the column of the first data object and the column of the second data object in a particular column pair and a number of distinct elements between the columns of the column pair;
calculating a prediction score based at least in part on each pair of columns' uniqueness score and intersect score, and
present at least a portion of the at least one identified join combination operation to a user interface,
wherein the presented portion of the at least one identified join combination operations corresponds to column pairs having relatively higher prediction scores.

16. The system of claim 15, the one or more processors further operable to:

receive a selection of a particular presented join combination operation via the user interface in response to the presentation execute the particular join combination operation of the first and second data objects; and store the results of the executed join combination operation as a third data object.

17. The system of claim 15, the one or more processors further operable to:

determine a combination grade associated with the identified join combination operation; and present the combination grade to the user interface in association with the corresponding at least one identified join combination operation.

18. The method of claim 1, wherein calculating a uniqueness score comprises:

identifying a total number of distinct elements in a particular column; and dividing the total number of distinct elements in the particular column by the total number of elements in the particular column.

19. The method of claim 1, wherein the priority score for a particular column pair is based on at least one of the following:

a relative similarity of names of each column;

a relative similarity of each columns' type; and the uniqueness scores associated with each column.

20. The method of claim 1, wherein, for calculating the prediction score, the uniqueness score and intersect score for column pairs is non-linearly weighted.

* * * * *